US006435496B1

(12) United States Patent
Phillips

(10) Patent No.: US 6,435,496 B1
(45) Date of Patent: Aug. 20, 2002

(54) LOW-PROFILE ROCKING LEVER CLAMP

(76) Inventor: Steven E. Phillips, 44 Linden St., Boylston, MA (US) 01505

(*) Notice: Subject to any disclaimer, the term of this patent is extended or adjusted under 35 U.S.C. 154(b) by 0 days.

(21) Appl. No.: 09/624,871

(22) Filed: Jul. 21, 2000

Related U.S. Application Data

(60) Provisional application No. 60/145,514, filed on Jul. 23, 1999.

(51) Int. Cl.[7] .......... B23Q 3/02
(52) U.S. Cl. .......... 269/94; 269/138; 269/234
(58) Field of Search .......... 254/138, 94, 234, 254/165, 203

(56) References Cited

U.S. PATENT DOCUMENTS

| | | | | |
|---|---|---|---|---|
| 2,587,025 A | | 2/1952 | Beck et al. | 90/61 |
| 2,667,799 A | | 2/1954 | Rzepela | 81/17 |
| 4,804,171 A | * | 2/1989 | Dornfeld | 269/138 |
| 4,805,888 A | | 2/1989 | Bishop | 269/99 |
| 4,958,813 A | | 9/1990 | Dykstra | 269/32 |
| 5,624,106 A | * | 4/1997 | Weber | 269/138 |
| 5,718,420 A | * | 2/1998 | Bernstein | 269/138 |
| 5,961,108 A | * | 10/1999 | Weber | 269/138 |

OTHER PUBLICATIONS

Mitee–Bite Spring 2000 flyer (7 pages).
Carrlane Web site promotional materials (3 pages) 1998.

* cited by examiner

*Primary Examiner*—Joseph J. Hail, III
*Assistant Examiner*—Lee Wilson
(74) *Attorney, Agent, or Firm*—Pandiscio & Pandiscio

(57) ABSTRACT

A rocking lever clamp device is disclosed for holding a workpiece. The rocking lever clamp is a one-piece design. In a preferred embodiment, the rocking lever clamp contains an elongated hole to permit rotation of the clamp relative to downward motion of a jacking screw. In another preferred embodiment, an automatic clamping system is disclosed to rotate the clamp. The rotation of rocking lever clamp causes a workpiece-engaging edge to hold a workpiece.

23 Claims, 23 Drawing Sheets

LOW-PROFILE ROCKING LEVER CLAMP

CROSS-REFERENCE TO RELATED APPLICATION

This patent application claims benefit of pending prior U.S. Provisional Patent Application Ser. No. 60/145,514, filed Jul. 23, 1999 by Steven E. Phillips for PITBULL CLAMP™ LOW-PROFILE TOE CLAMP, which patent application is hereby incorporated herein by reference.

FIELD OF THE INVENTION

This invention relates generally to clamping devices, and more particularly to adjustable, low-profile toe clamping devices for holding a workpiece.

BACKGROUND OF THE INVENTION

Low-profile toe clamps are used by machinists and manufacturers to hold workpieces or stock, such as aluminum, steel, brass, etc., that will be machined into a product or component of a product. A workbed, fixture plate, or similar device is designed to accept the workpieces and toe clamps in order to hold the workpieces in place while machining occurs.

Toe clamps secure the workpiece to a fixture plate with downward and inward force so as to prevent relative movement. This securing is important for both safety and accuracy. If the workpiece moves during the machining process, the workpiece may be rendered useless due to incorrect tolerances. The workpiece may also become unclamped if the clamping system fails.

There are several machine clamps disclosed in the prior art. One is U.S. Pat. No. 2,587,025 issued Feb. 26, 1952 to G. H. Beck et al. for WORK CLAMP. Another is U.S. Pat. No. 4,805,888 to Bishop for ORBITAL-ACTION CLAMPS.

Beck appears to disclose a rocking clamp with an abutment bolted to a work surface. The abutment forms an acute angle relative to the work surface. The clamp has arcuate bottom corner which is contained in the acute angle between the abutment and the work surface. As the clamp rotates relative to the abutment block, an upward force is created on the abutment block. This force may cause the bolts holding the abutment block to the work surface, or another part of the Beck system, to fail. Beck also appears to rely on a slot in the work surface in order to accommodate horizontal displacement of the clamp during the tightening process.

Bishop discloses orbital-action clamps for securing a workpiece. The clamp has a head portion in rotatably eccentric independent motion from a base portion. The eccentric motion of the head causes flat surfaces about the periphery of the clamp to engage the workpiece. The Bishop disclosure uses eccentric horizontal motion to engage a surface.

OBJECTS OF THE INVENTION

One object of the invention is to provide a low-profile clamping device.

Another object of the invention is to provide greater clamping force.

And another object of the invention is to provide a low-profile clamping device which provides a substantial vertical, as well as horizontal, clamping force.

And another object of the invention is to provide a clamping apparatus generating sufficient force to hold a workpiece using fewer clamps, thereby reducing material and set-up costs.

Still another object of the invention is to provide clamping devices which can be incorporated into existing fixtures or work jaws.

Yet another object of the invention is to provide a clamping system with a one-piece fixture base or a multi-piece fixture base.

And another object of the invention is to provide a clamping apparatus having predictable and accurate contact, parallelism, and clamping force with the workpiece.

And another object of the invention is to provide a clamping apparatus which may be used with a standard screw.

And still another object of the invention is to provide a clamping apparatus having a high degree of safety.

SUMMARY OF THE INVENTION

These and other objects of the invention are addressed by the present invention, which comprises a clamp for securing a workpiece to a support. The invention includes the rocking clamp having, on opposed ends, a vertical arcuate edge and a workpiece-engaging edge. The vertical arcuate edge is rotatably held by the support at a vertical, and a horizontal, contact point. The rocking clamp contains a substantially vertical hole located between the arcuate edge and the workpiece-engaging edge. The hole is sized to allow a middle portion of the shank of a screw to non-threadably pass through the rocking clamp. The hole is also elongated in the direction of an axis from the vertical arcuate edge to the workpiece-engaging edge.

A jacking screw is inserted through the hole in the rocking clamp to threadably engage the support. As the jacking screw is tightened into the support, the head of the screw engages the rocking clamp. This causes the vertical arcuate edge to rotate and the engaging edge to secure the workpiece. The workpiece may be removed after loosening the screw.

In one embodiment, the support is configured with the horizontal contact point of the arcuate edge at a level below the bottom of the workpiece.

In another embodiment, the support is configured with the horizontal contact point of the arcuate edge at the same level as the bottom of the workpiece.

In yet another embodiment, the support is configured with the horizontal contact point of the arcuate edge at a level above the bottom of the workpiece.

In one form of the invention, the vertical arcuate edge has a circular radius and rotates about a particular point.

In another form of the invention, the vertical arcuate edge has an elliptical radius and rotates about a moving center.

In one form of the invention, the workpiece-engaging edge may be a knife edge, an angled edge, a serrated edge, a straight edge, or an arcuate edge, and/or may be coated with urethane, rubber, industrial diamond, polymer or a hardened material.

In another form of the invention, the workpiece-engaging edge is a machinable jaw. A removable pin is provided to secure the rocking clamp for machining the jaw.

In one embodiment, the elongated hole is slightly radiused at the shoulder portion between the jacking screw and the rocking clamp.

In a preferred embodiment, the elongated hole is counterbored to substantially contain the head of the jacking screw within the rocking clamp.

In still another embodiment, a spherical washer is configured annularly about the jacking screw between the head of the jacking screw and the rocking clamp.

In yet another embodiment, an O-ring is configured annularly about the jacking screw between the rocking clamp and the supporting surface.

In yet another embodiment, gripping parallels secure a workpiece on a magnetic surface.

In another embodiment, a spring is configured annularly about the jacking screw between the rocking clamp and the supporting surface.

In an embodiment, the rocking clamp is surrounded by a urethane skirt.

In another embodiment, the rocking clamp is encapsulated in a resilient material.

In still another embodiment, a fixture base with a clamp trough contains one or more rocking clamps.

In another preferred embodiment, an automatic clamping system is disclosed.

In one preferred embodiment, the rocking clamp may be formed out of brass, bronze, steel, carbide, ceramics, plastic and the like.

DETAILED DESCRIPTION OF THE PREFERRED EMBODIMENTS

Figure 1:
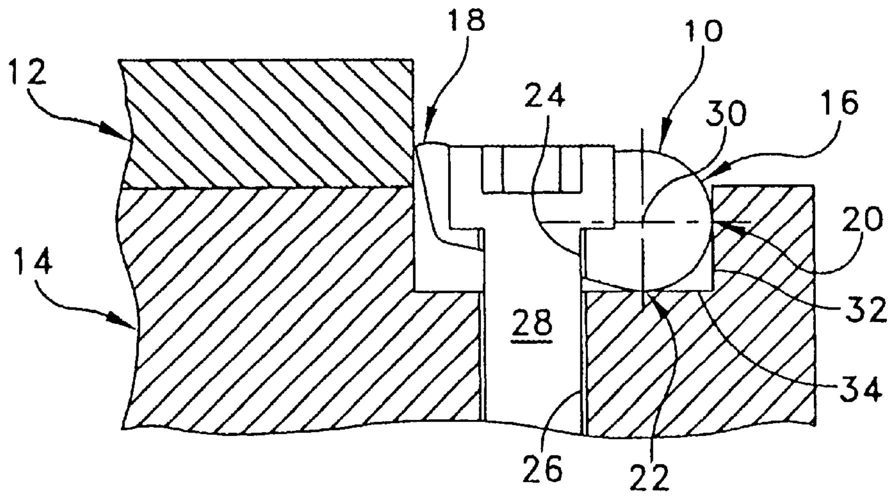
FIG. 1 is a profile view of the low-profile rocking lever clamp apparatus.

A rocking clamp 10 is disclosed for securing a workpiece 12 to a support 14. Referring to FIGS. 1–7, rocking clamp 10 is shown with a vertical arcuate edge 16 and an opposing workpiece-engaging edge 18. Vertical arcuate edge 16 is rotatably held by support 14 at a vertical contact point 20 and at a horizontal contact point 22.

Figure 7:
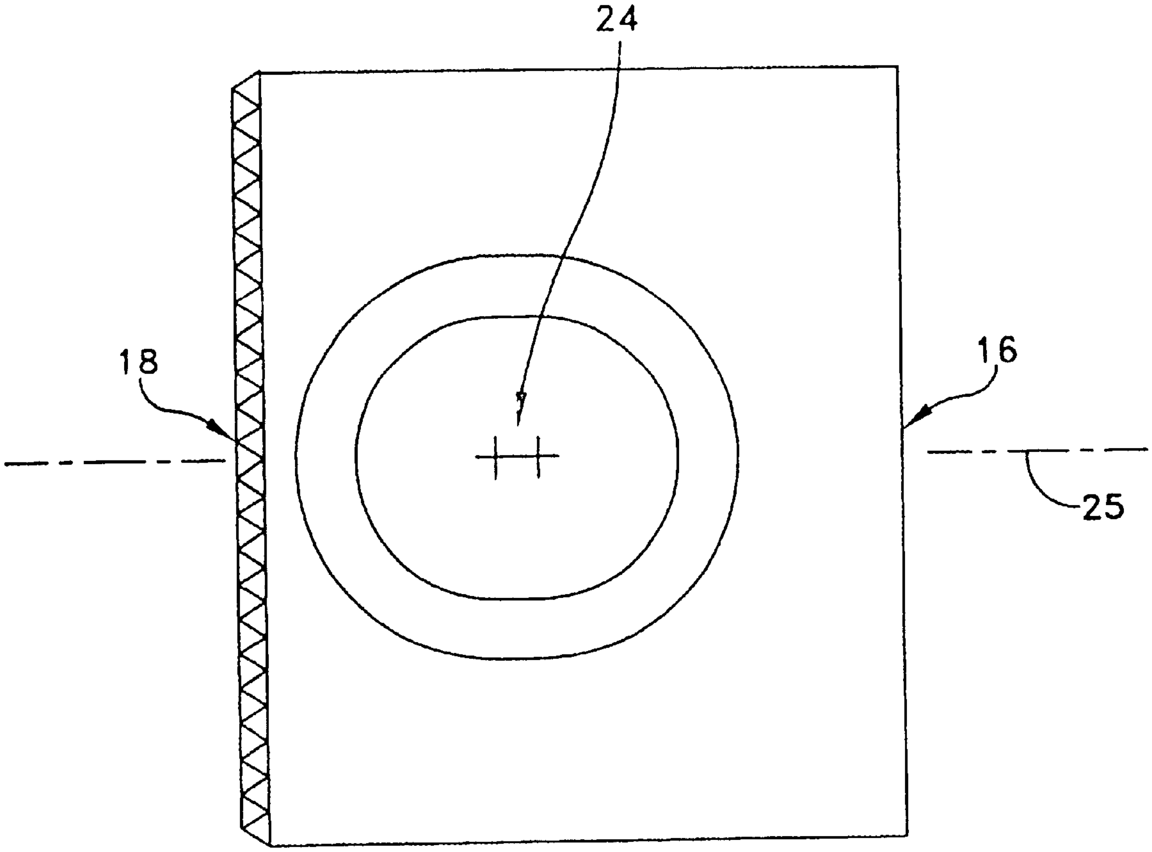
FIG. 7 is a top planar view of the rocking lever clamp showing the elongated hole.

As shown in FIG. 7, rocking clamp 10 also contains a substantially vertical hole 24 located between arcuate edge 16 and workpiece-engaging edge 18. Hole 24 is sized to allow a middle portion of the shank of a screw to non-threadably pass through rocking clamp 10. Hole 24 is elongated in the direction of an axis 25 (FIG. 7) from vertical arcuate edge 16 to workpiece-engaging edge 18. If desired, hole 24 may be extended so as to open on workpiece-engaging edge 18 or vertical arcuate edge 16.

A jacking screw 28 is inserted through hole 24 to threadably engage a tapped hole 26 in support 14. Tightening of jacking screw 28 causes the head of jacking screw 28 to apply force on rocking clamp 10. This force causes vertical arcuate edge 16 to rotate and causes engaging edge 18 to contact workpiece 12. Loosening jacking screw 28 reduces the amount of force applied to rocking clamp 10. Workpiece 12 may be removed after enough force is reduced from rocking clamp 10.

Figure 2:
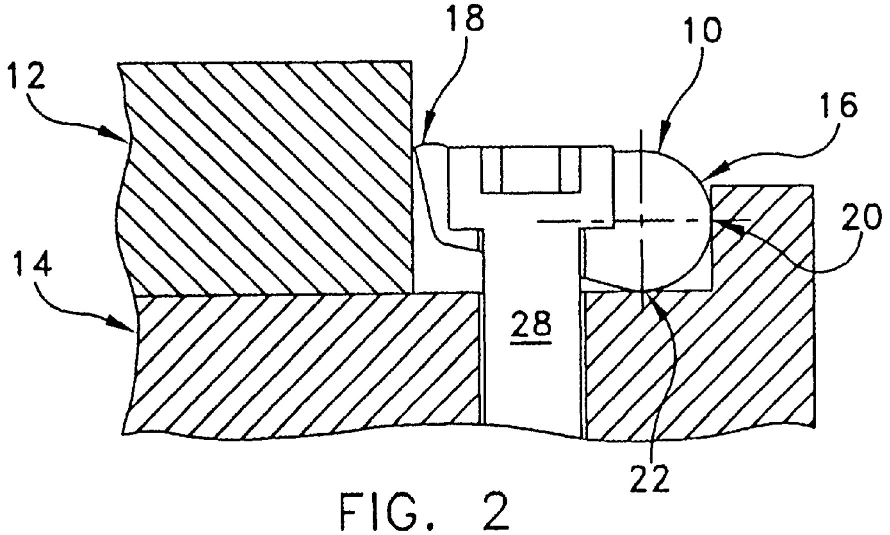
FIG. 2 is a profile view of the rocking lever clamp apparatus showing a planar support surface for the rocking clamp and the workpiece.
Figure 3:
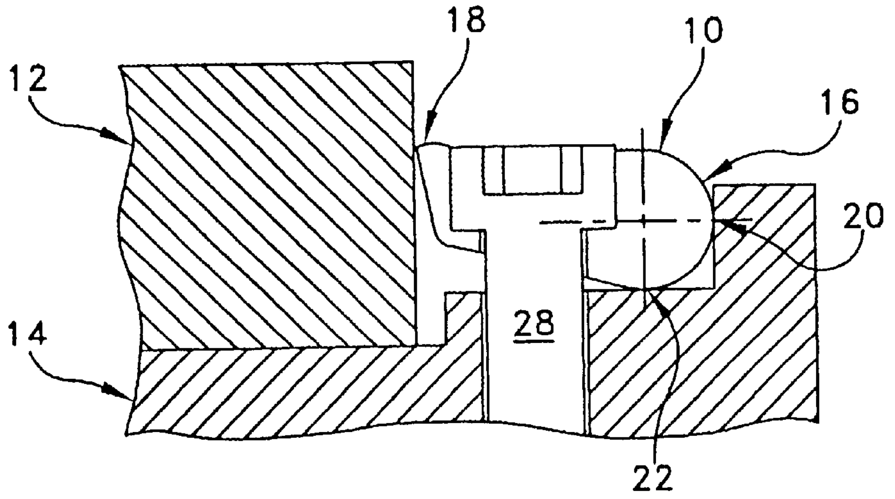
FIG. 3 is a profile view of the rocking lever clamp apparatus showing the workpiece at a level below the rocking lever clamp.
Figure 30:
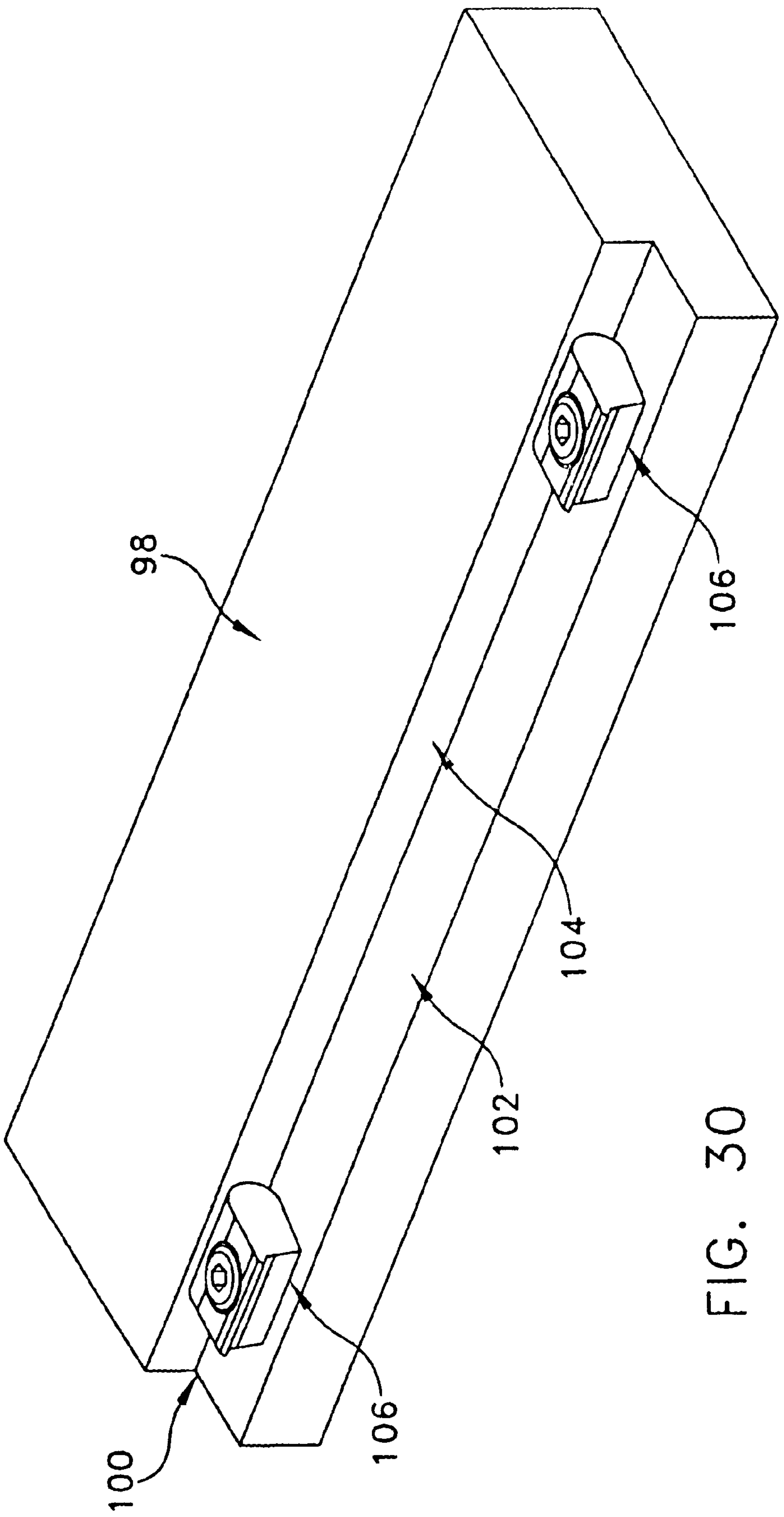
FIG. 30 is a perspective view of a gripping parallel.
Figure 31:
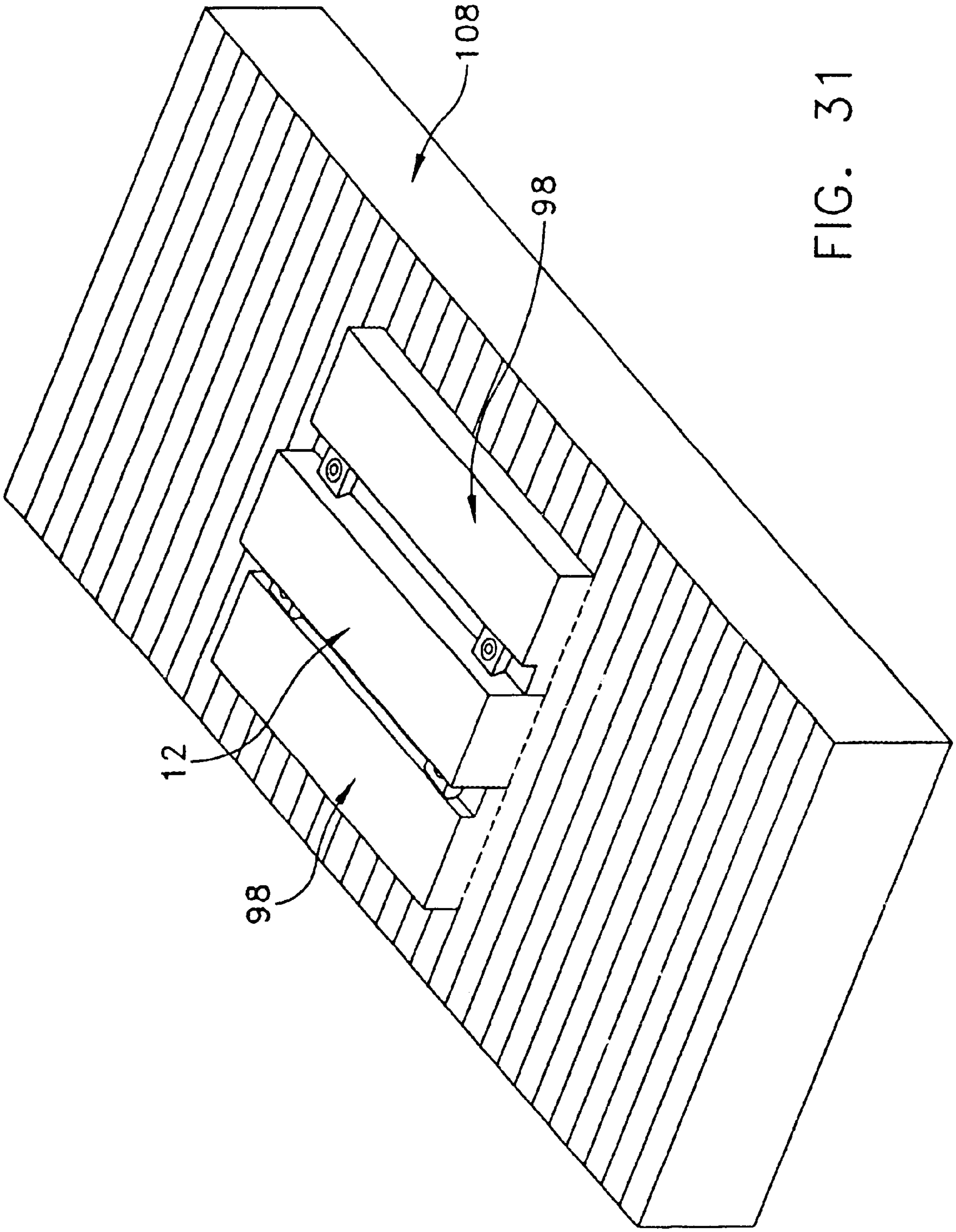
FIG. 31 is a perspective view of gripping parallels securing a workpiece to a surface.

Looking at FIGS. 1–3, support 14, relative to horizontal contact point 22 of vertical arcuate edge 16 of rocking clamp 10, may be configured below, above or equal to the level of workpiece 12. For example, in FIG. 1 the portion of support 14 relative to horizontal contact point 22 is shown below the level of workpiece 12. This configuration permits low-profile clamping of workpiece 12. In FIG. 2, horizontal contact point 22 is at the level of workpiece 12. This configuration permits both the workpiece 12 and clamp 10 to be positioned on the same planar work surface. In FIG. 3, horizontal contact point 22 is above the level of workpiece 12. This configuration also permits separate supporting members to be utilized, such as the gripping parallels 98 as shown in FIGS. 30 and 31.

Figure 4:
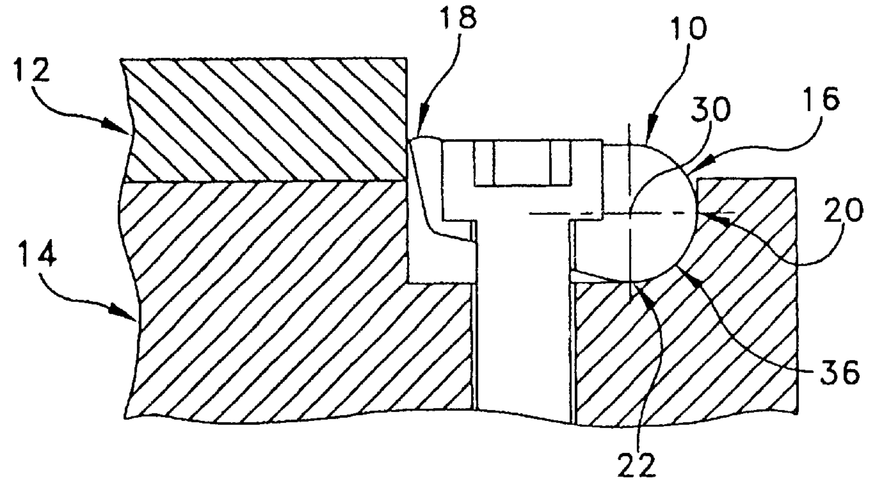
FIG. 4 is a profile view of the rocking lever clamp apparatus showing the arcuate surface of the support.

Now looking at FIGS. 1 and 4, vertical arcuate edge 16 is seen with a circular radius and a center of rotation 30. As seen in FIG. 1, vertical and horizontal contact points 20, 22 continuously contact support 14 on a vertical wall portion 32 and a horizontal floor portion 34, respectively. In another embodiment, as seen in FIG. 4, the configuration may be modified such that support 14 is an arcuate surface 36 corresponding to the radius of vertical arcuate edge 16. Arcuate surface 36 is advantageous in that force is transmitted between support 14 and rocking clamp 10 over the entire interface, in addition to vertical contact point 20 and horizontal contact point 22.

Figure 5:
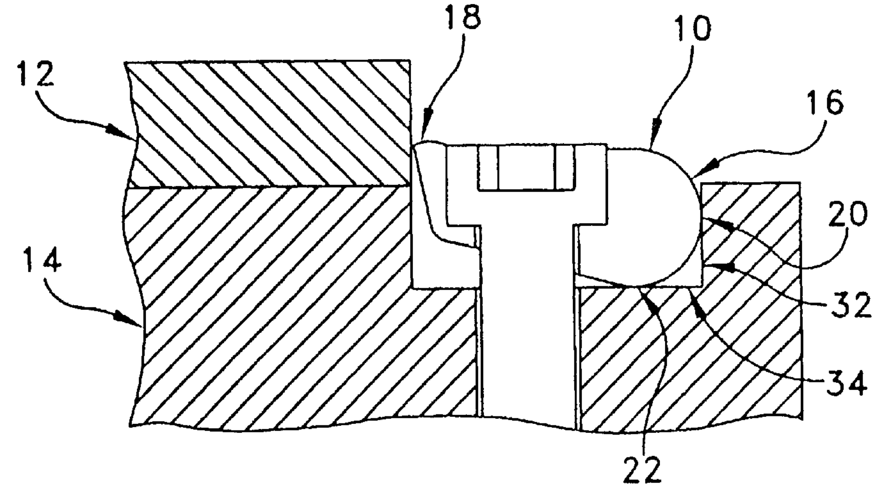
FIG. 5 is a profile view of the rocking lever clamp apparatus showing the vertical arcuate edge with vertically elongated elliptical radius.
Figure 6:
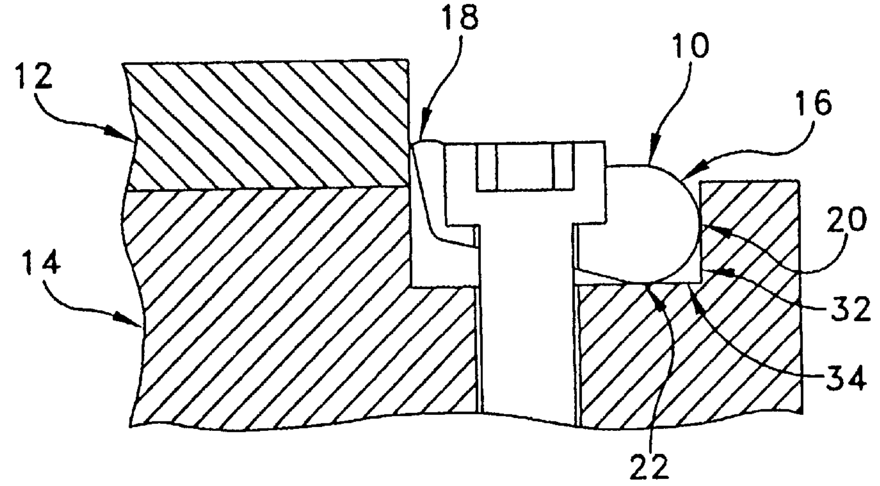
FIG. 6 is a profile view of the rocking lever clamp apparatus showing the vertical arcuate edge with an ellipitical radius horizontally elongated.

As seen in FIGS. 5 and 6, vertical arcuate edge 16 may be formed with elliptical radius with a moving center of rotation. Translative motion occurs as rocking clamp 10 rotates. The eliptical curvature of vertical arcuate edge 16 causes vertical and horizontal contact points 20, 22 to travel along vertical wall portion 32 and horizontal floor portion 34, respectively. This translative motion can be configured such that the non-circular rotation of vertical arcuate edge 16 causes greater horizontal translation of workpiece-engaging edge 18 toward workpiece 12. Changing the curvature of vertical arcuate edge 18 is important for adjusting the relative amounts of vertical and horizontal clamping force.

The magnitude of clamping force may also be increased by reducing the radius of vertical arcuate edge 16 or by reducing the depth of support 14 relative to horizontal contact point 20. In this respect it should be appreciated that the radius of vertical arcuate edge 16 can be reduced all the way down to a sharp point if desired. The clamping force is increased due to the creation of a longer lever arm and reduction in the effect of friction.

Now looking at FIGS. 8–12, several alternative embodiments of workpiece-engaging edge 18 are shown. Workpiece-engaging edge 18 may be configured as a knife edge 38, an angled edge 39, a serrated edge 40, a straight contact edge 42, and as a rounded edge 44. The engaging edge may also be coated with materials such as urethane, rubber, industrial diamond, polymer or a hardened material.

Figure 13:
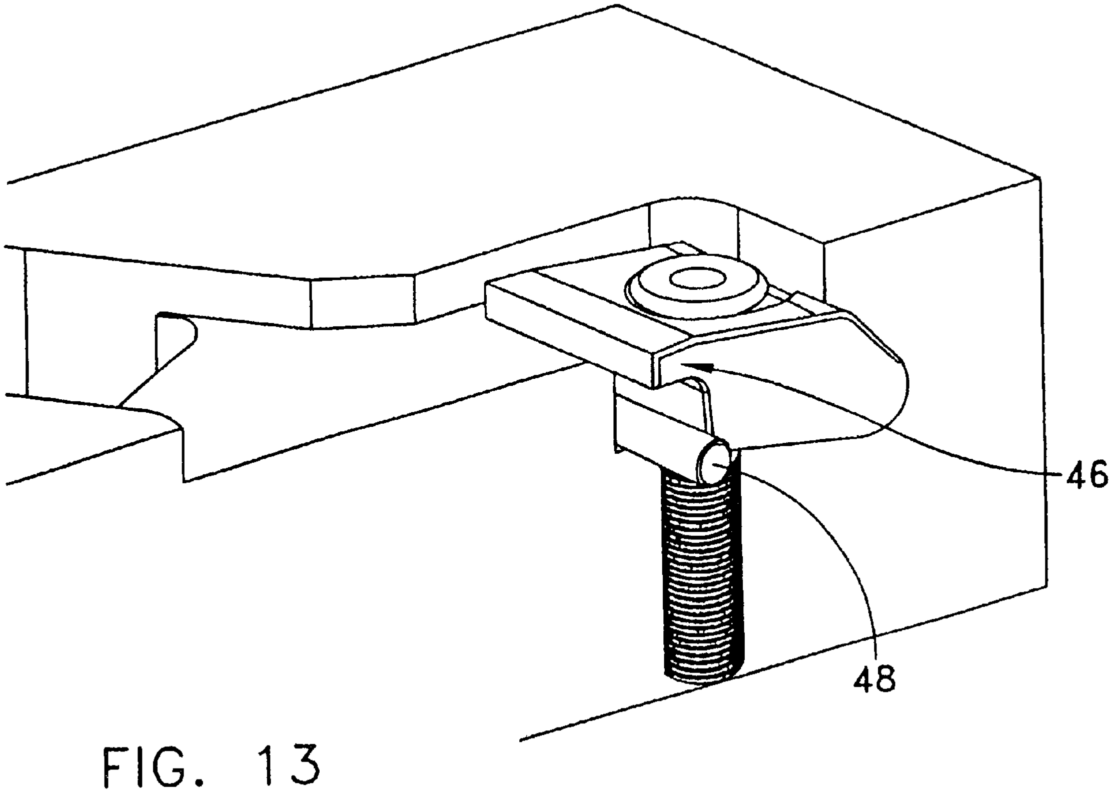
FIG. 13 is a perspective view of a rocking lever clamp with a machinable jaw prior to machining.
Figure 14:
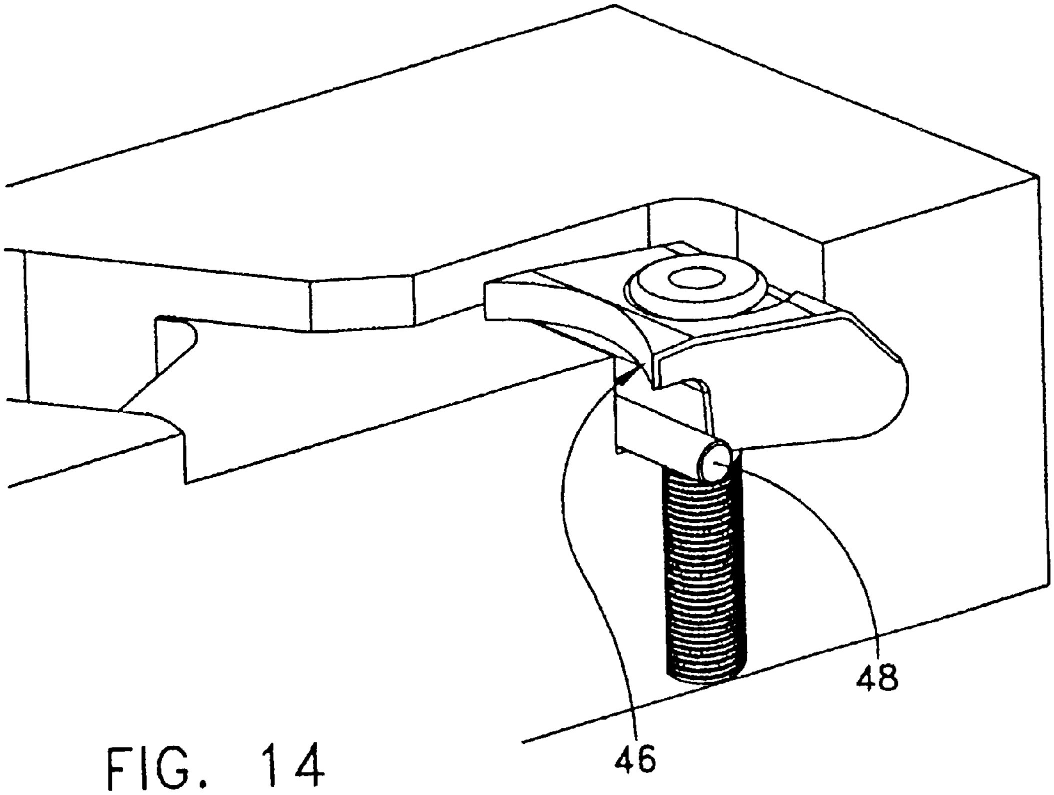
FIG. 14 is a perspective view of a rocking lever clamp with a machinable jaw after machining.
Figure 15:
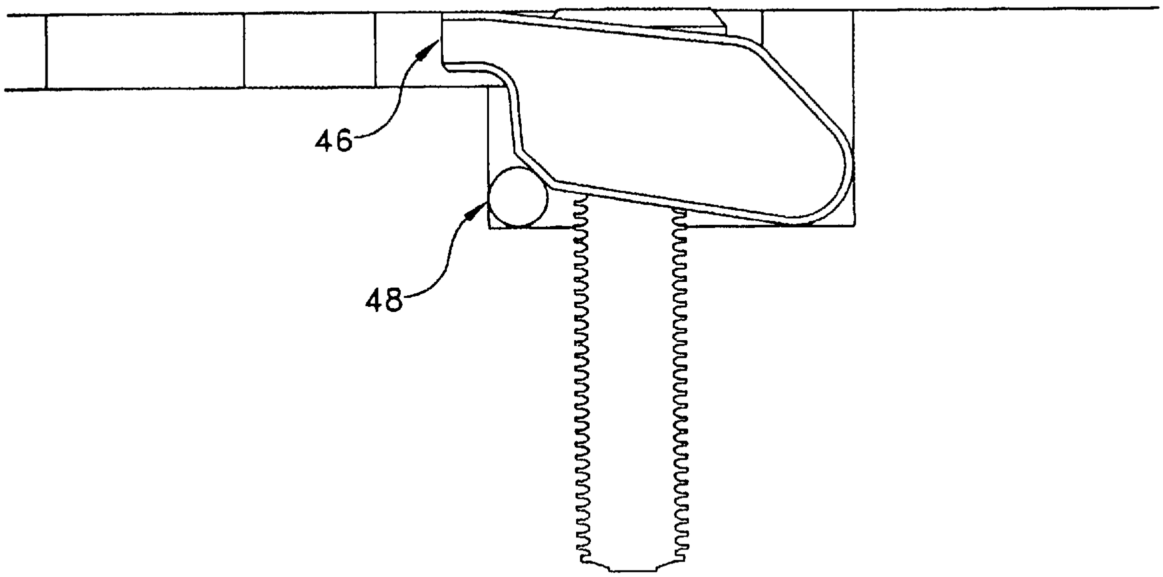
FIG. 15 is a side view of a machinable jaw with a removable pin.
Figure 16:
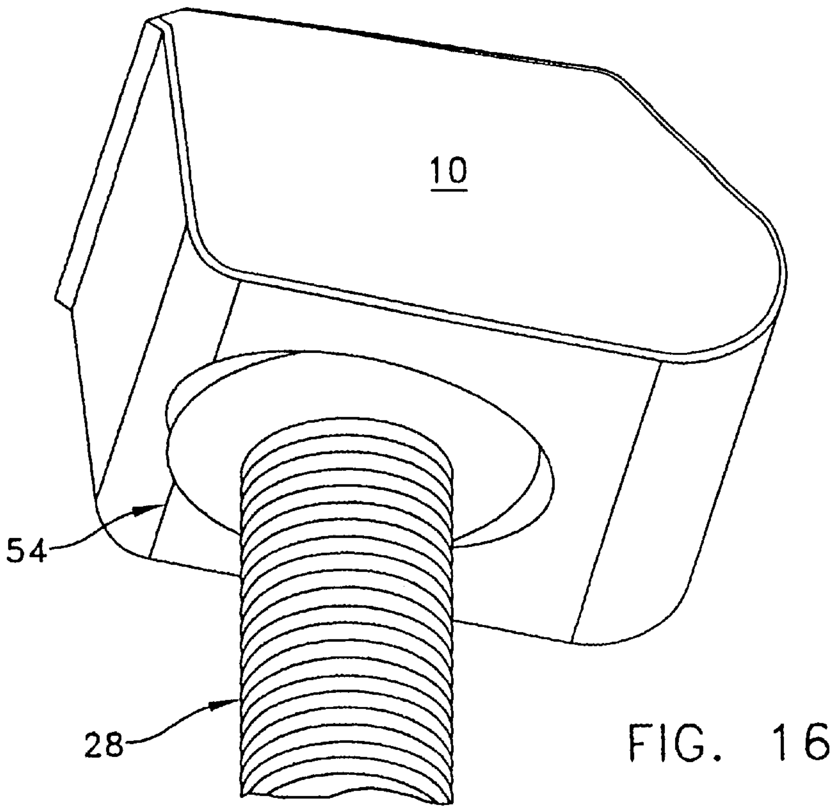
FIG. 16 is a perspective view of a rocking lever clamp with an O-ring.

FIGS. 13–15 depict a machinable jaw 46 that may be provided for custom clamping a workpiece 12. This feature is important to permit clamping when workpiece 12 has a non-linear interface with rocking clamp 12. Machinable jaw 46 is also provided with a removable pin 48. Pin 48 secures rocking clamp 10 while the workpiece-engaging edge 18 is machined. Pin 48 is thereafter removed to permit movement of rocking clamp 10 relative to support 14.

Referring again to FIG. 7, hole 24 is shown elongated in the direction of vertical arcuate edge 16 to workpiece-engaging edge 18. Elongated hole 24 permits rocking clamp 10 to articulate horizontally when jacking screw 28 travels in a linear direction. The amount of elongation for hole 24 is dependent on the size and curvature of vertical arcuate edge 16, and the size and positioning of workpiece-engaging edge 18.

Figure 8:
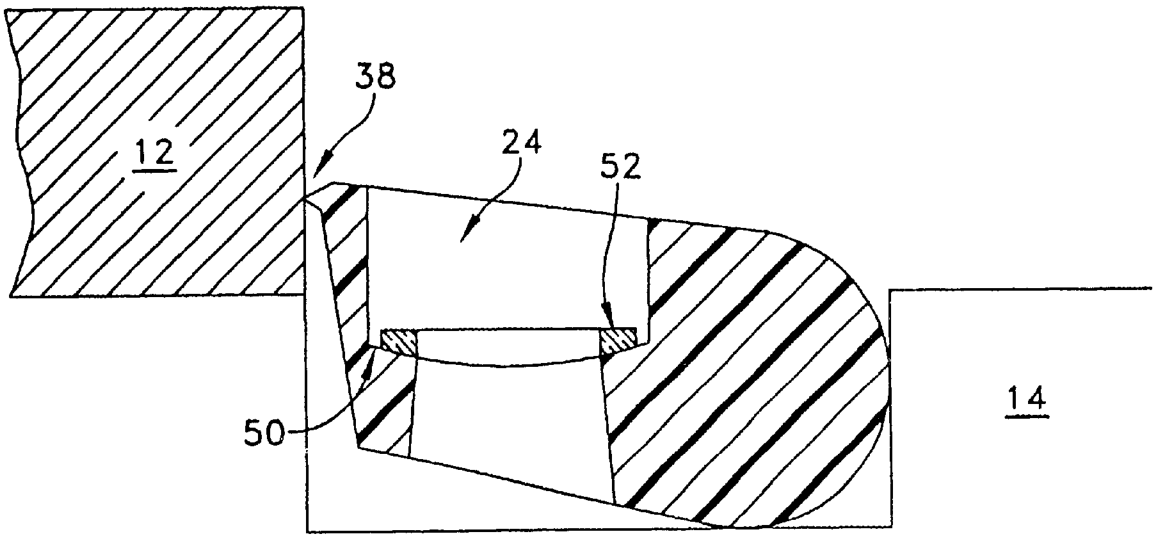
FIG. 8 is a profile view of rocking lever clamp apparatus showing a counter-bored hole having a radiused shoulder with a spherical washer and a workpiece-engaging knife edge.
Figure 9:
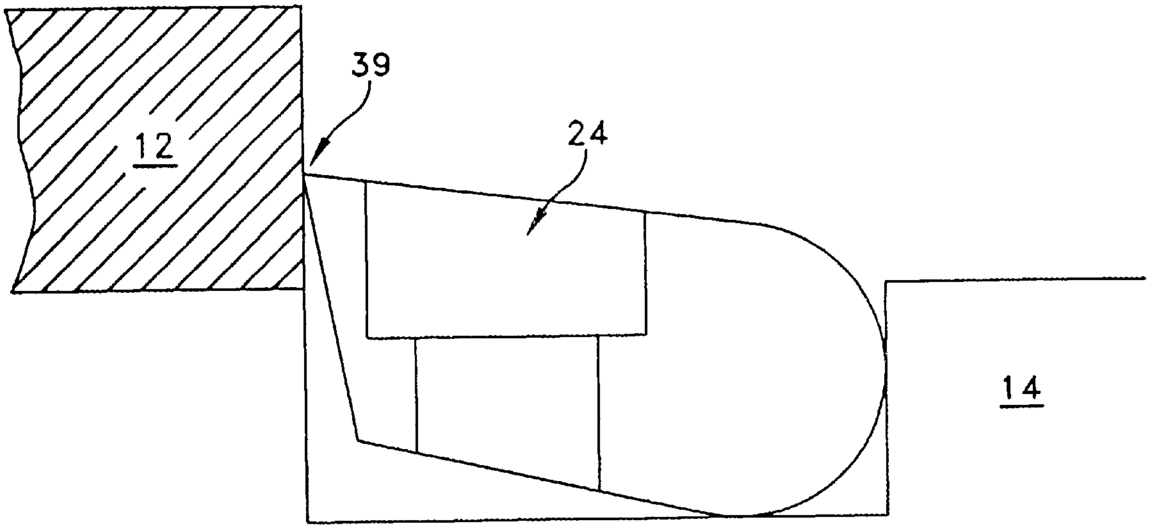
FIG. 9 is a profile view of a rocking lever clamp with a workpiece-engaging angled edge.
Figure 10:
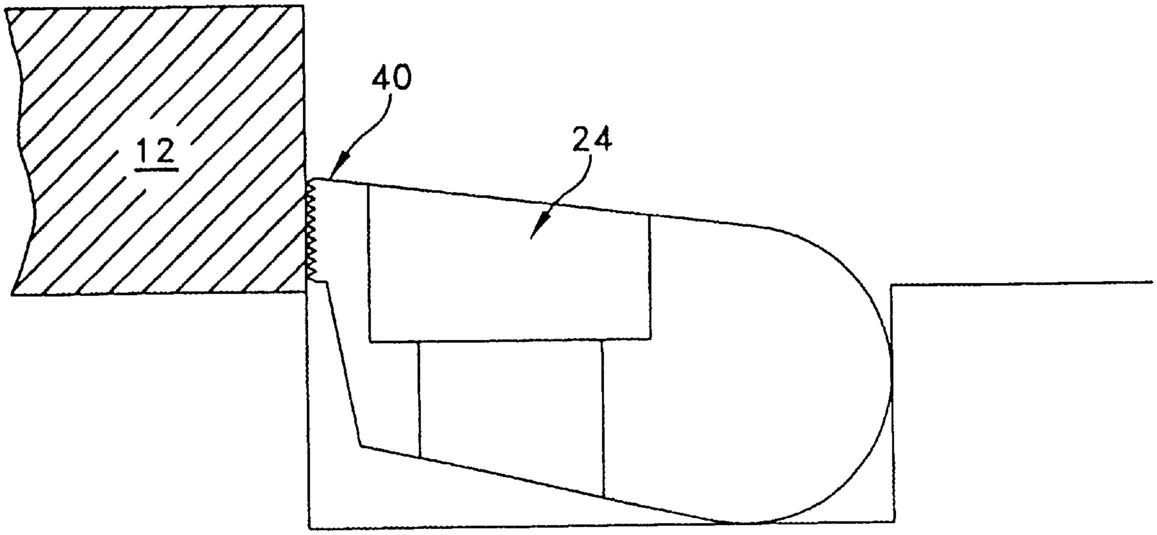
FIG. 10 is a profile view of a rocking lever clamp with a workpiece-engaging serrated edge.
Figure 11:
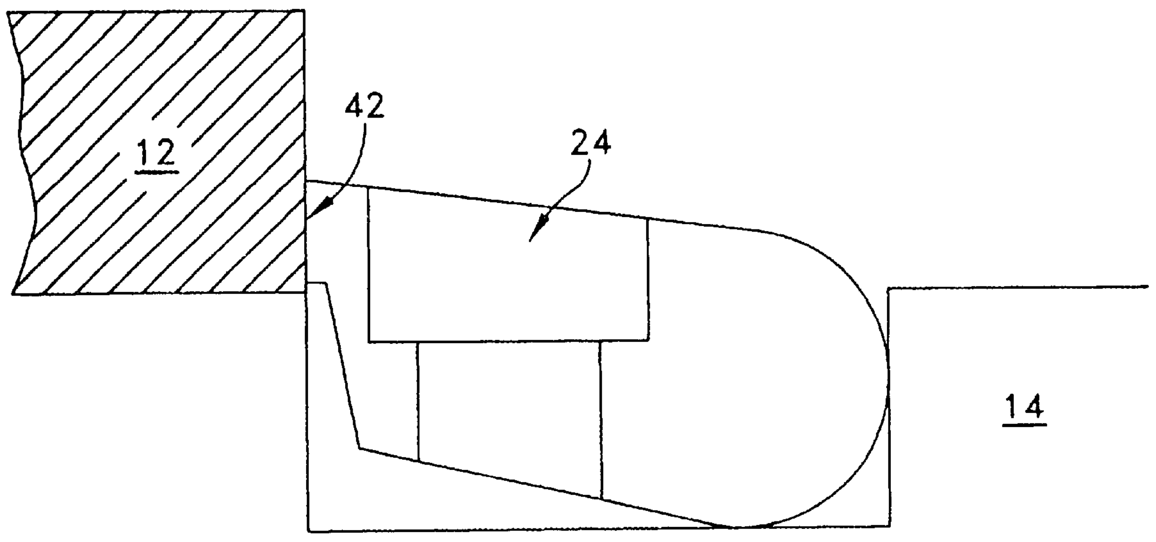
FIG. 11 is a profile view of a rocking lever clamp with a workpiece-engaging straight edge.
Figure 12:
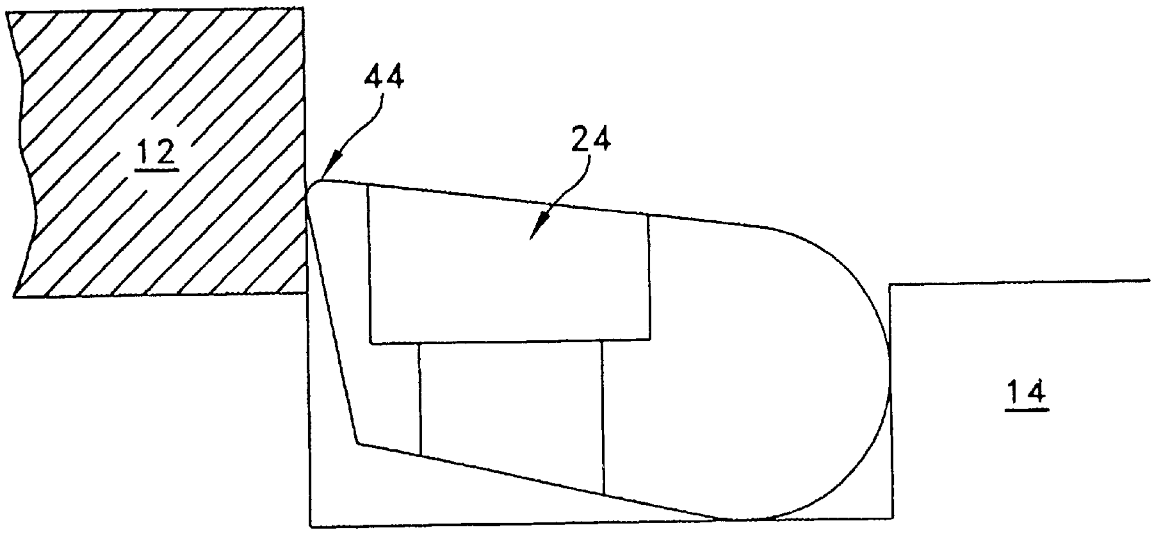
FIG. 12 is a profile view of a rocking lever clamp with a workpiece-engaging rounded edge.

Looking again at FIG. 8, hole 24 is shown with a slightly radiused shoulder 50. Radiused shoulder 50 permits easier translation of rocking clamp 10 with respect to the head of jacking screw 28. In another embodiment, not shown, the bottom of jacking screw 28 may be radiused instead of, or in addition to, the shoulder of hole 24.

In a preferred embodiment of the invention, hole 24 is counter-bored into rocking clamp 10. Counter-bored hole 24 permits the head of jacking screw 28 to be substantially contained below the surface of rocking clamp 10. This configuration allows additional access to workpiece 12 as the head of jacking screw 28 is not protruding above rocking clamp 10.

Again referring to FIG. 8, radiused shoulder 50 preferably contains a spherical washer 52 annularly configured about jacking screw 28. Spherical washer 52 aids in further reducing friction as rocking clamp 10 moves relative to jacking screw 28. Additionally, spherical washer 52 helps to keep material out of this interface.

Now looking at FIGS. 16–19, an O-ring 54 is annularly configured about jacking screw 28 in a recess 56 below rocking clamp 10. In another embodiment, a spring (not shown) is configured between rocking clamp 10 and support 14 in place of O-ring 54. O-ring 54, or the spring (not shown), urges rocking clamp 10 away from support 14 when jacking screw 28 is loosened. O-ring 54, or the spring (not shown), helps keep rocking clamp 10 aligned with jacking screw 56 as the rocking clamp translates laterally during tightening of the jacking screw.

Figure 20:
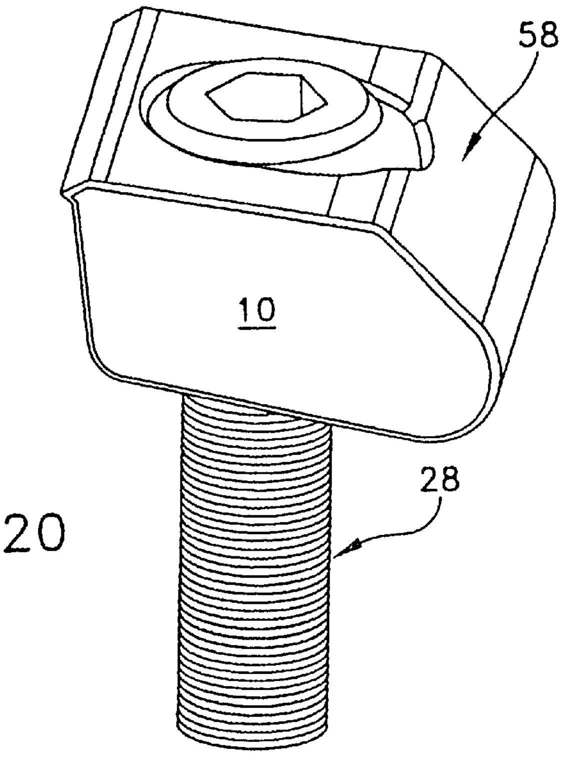
FIG. 20 is a perspective view of a rocking lever clamp surrounded by a urethane skirt.
Figure 17:
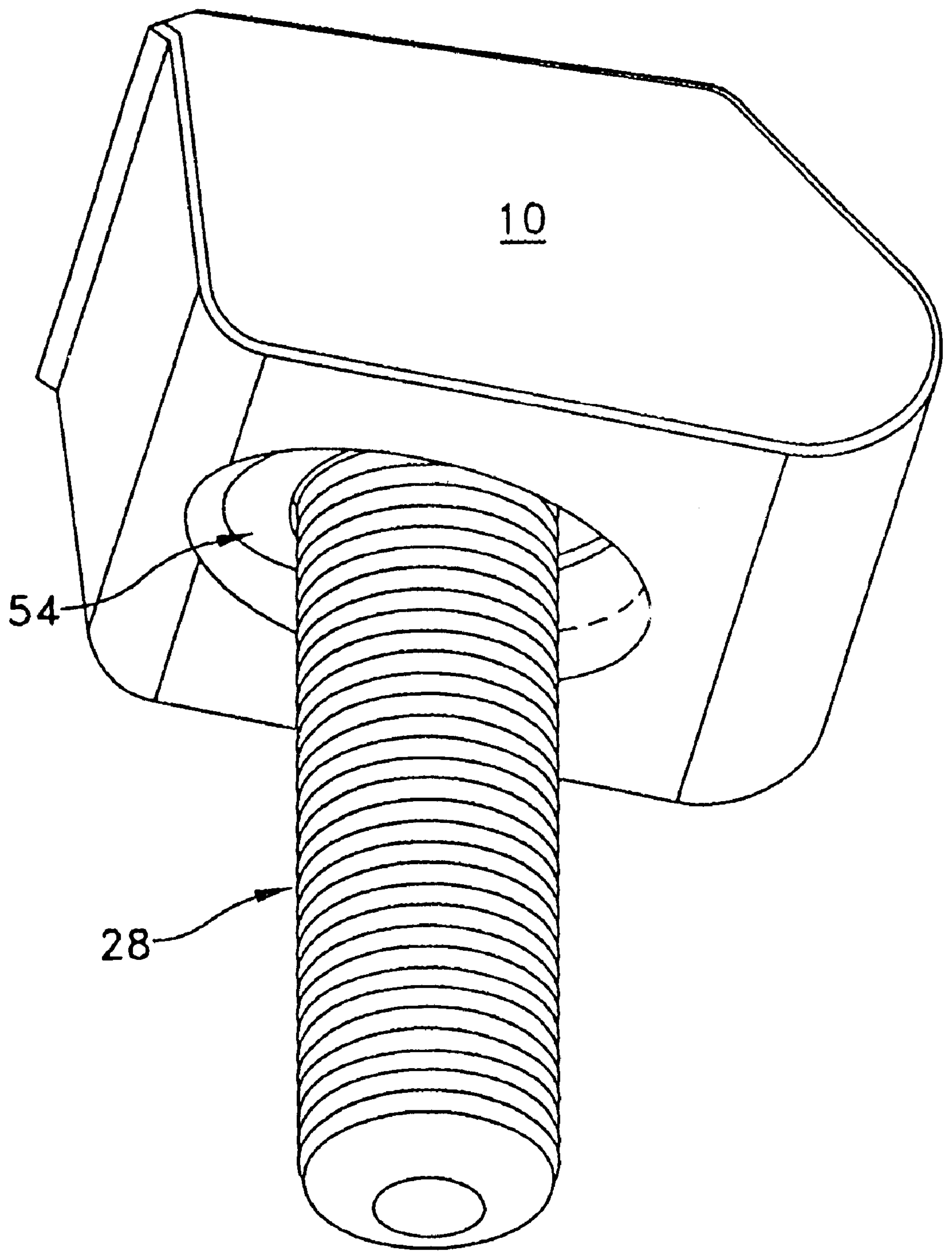
FIG. 17 is a perspective view of a rocking lever clamp with a recess for an O-ring or a spring.
Figure 18:
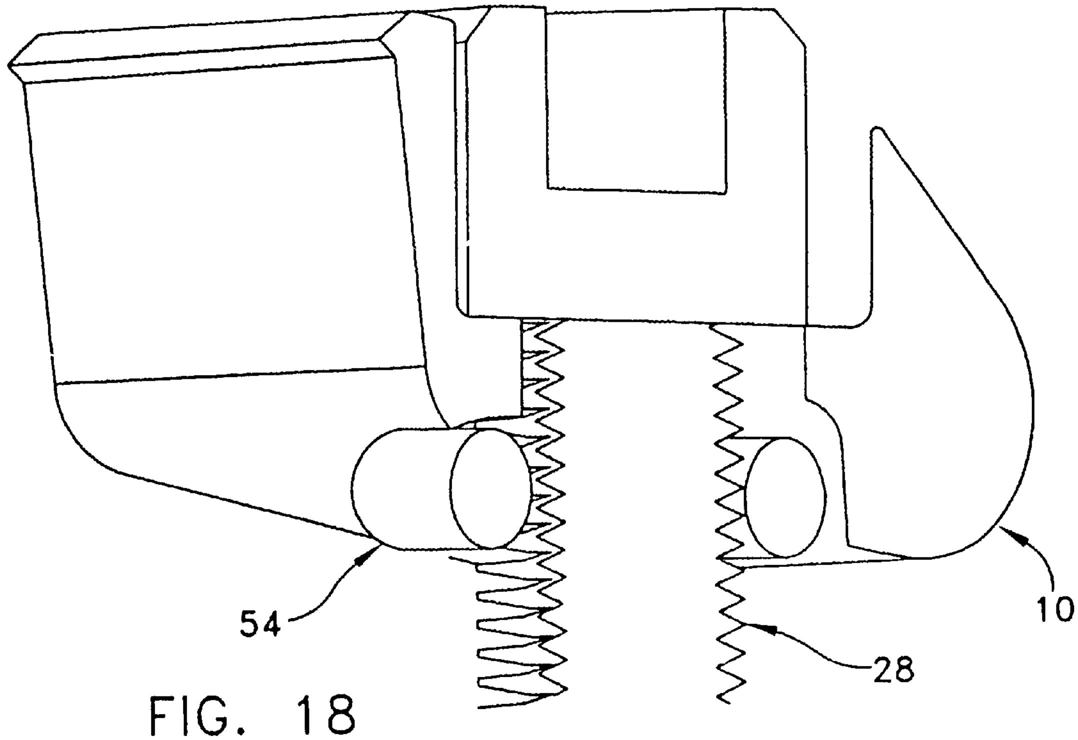
FIG. 18 is a cross-sectional, perspective view of a rocking lever clamp with an O-ring configured about a jacking screw.
Figure 19:
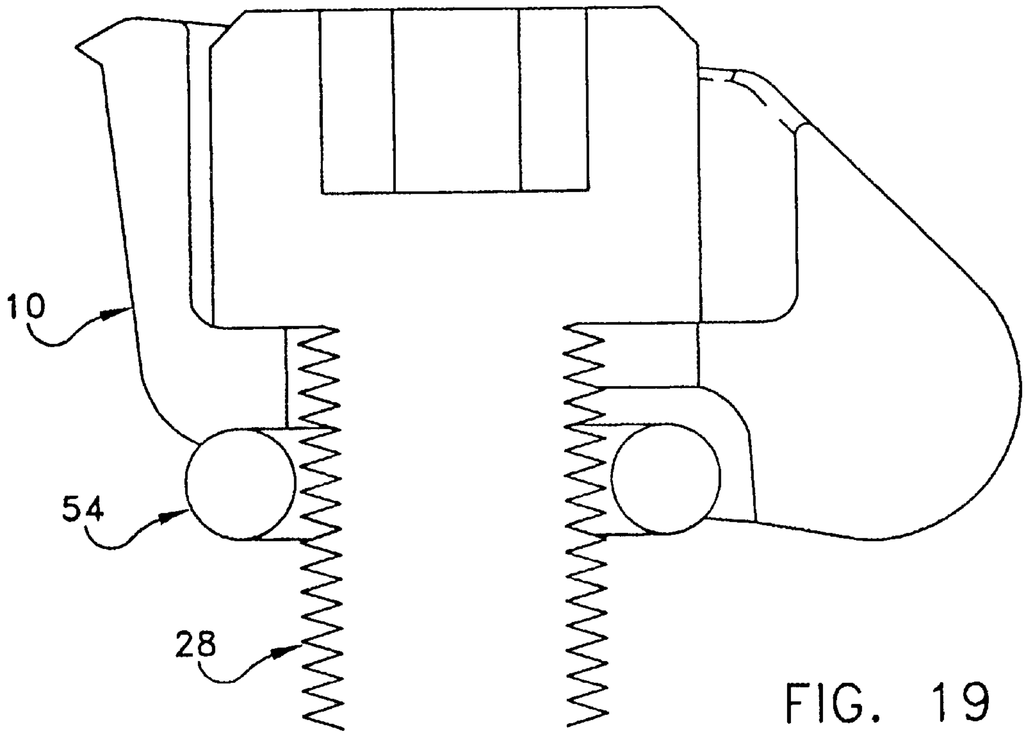
FIG. 19 is a cross-sectional side view of a rocking lever clamp with an O-ring configured about a jacking screw.

FIG. 20 shows another embodiment of the invention in which a urethane skirt 58 surrounds rocking clamp 10. Urethane skirt 58 absorbs pressure created at the rocking clamp's interfaces with workpiece 12 and support 14. If desired, skirt 58 may cover only a portion of rocking clamp 10.

Figure 21:
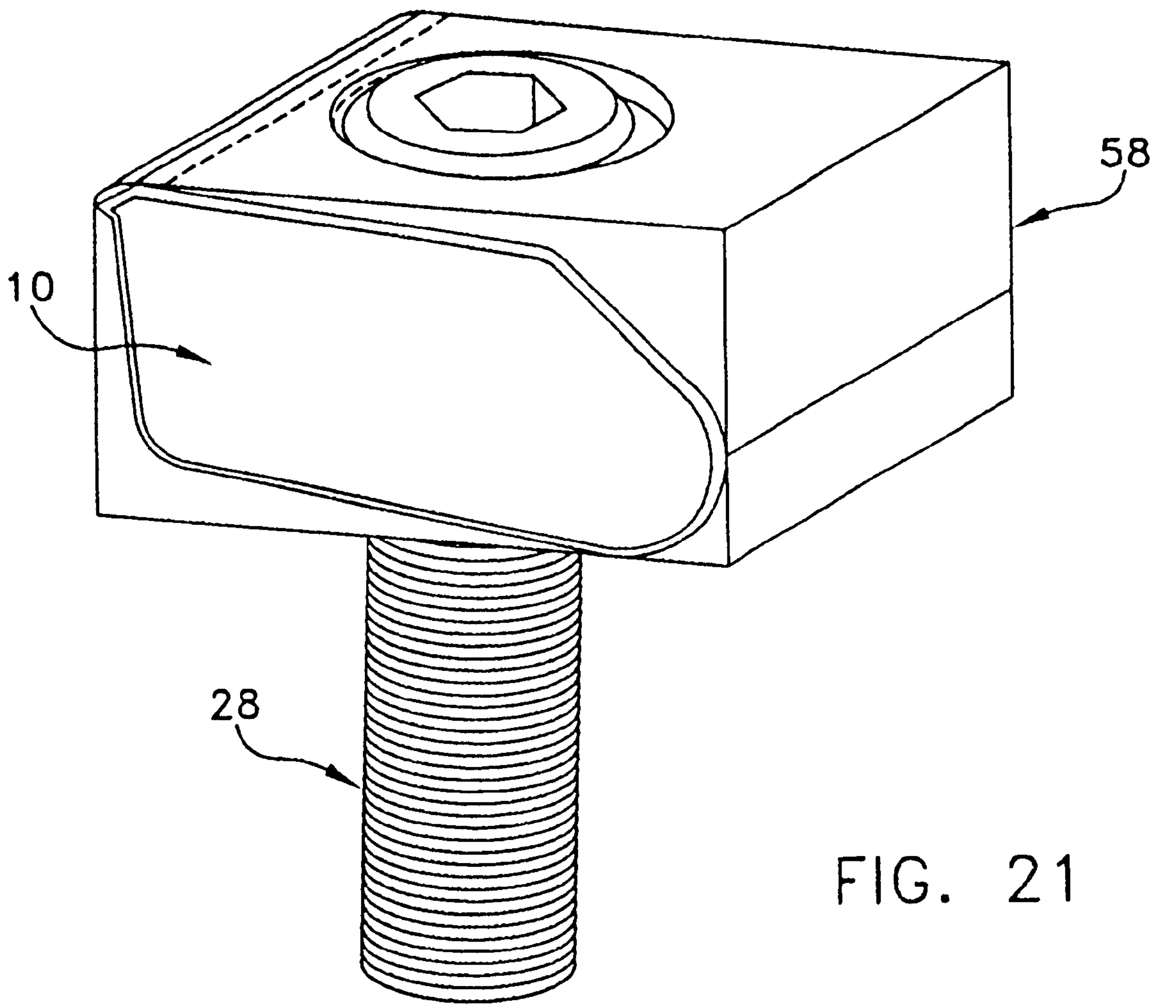
FIG. 21 is a perspective view of a rocking lever clamp in an elastomer encapsulation.

Looking next at FIG. 21, in another preferred embodiment of the invention, antelastomer encapsulation 58 surrounds rocking clamp 10. As jacking screw 28 is tightened and workpiece-engaging edge 18 is driven into workpiece 12, elastomer encapsulation 58 is compressed. Elastomer encapsulation 58 provides lift when releasing clamp 10. In other words, as jacking screw 28 is loosened, this force urges rocking clamp 10 away from workpiece 12. Encapsulation 58 helps prevent chips or debris from getting underneath clamp 10.

Figure 22:
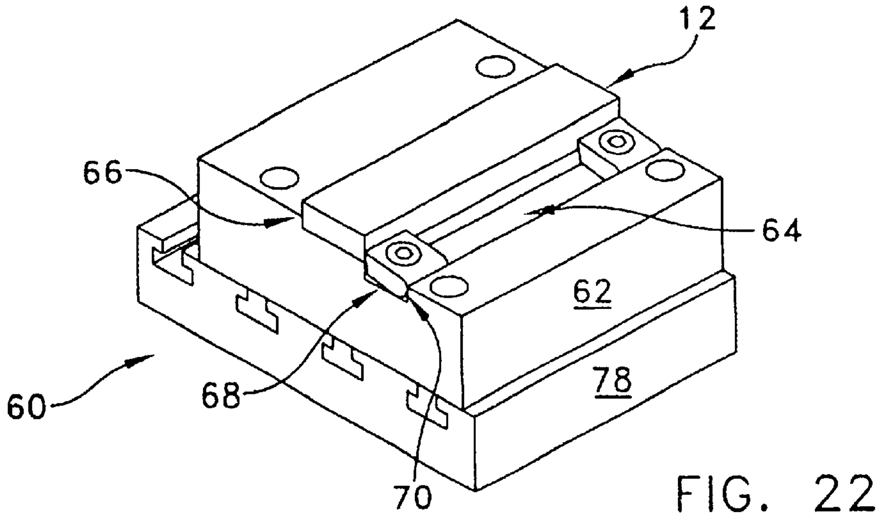
FIG. 22 is a perspective view of a clamping system.
Figure 23:
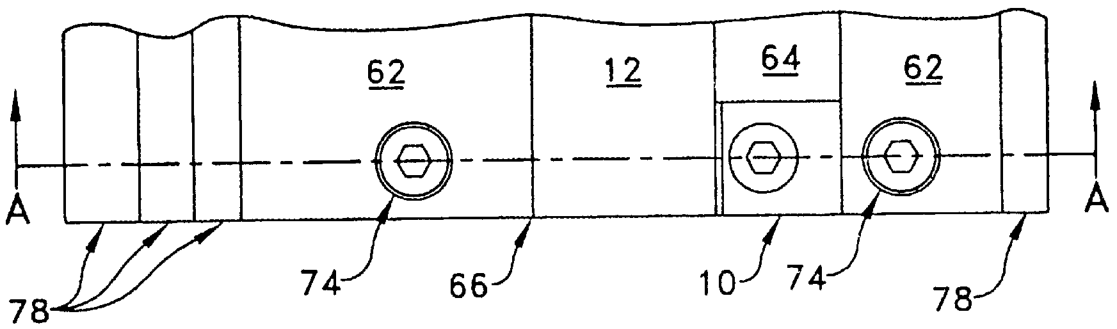
FIG. 23 is a top planar view of a clamping system.
Figure 24:
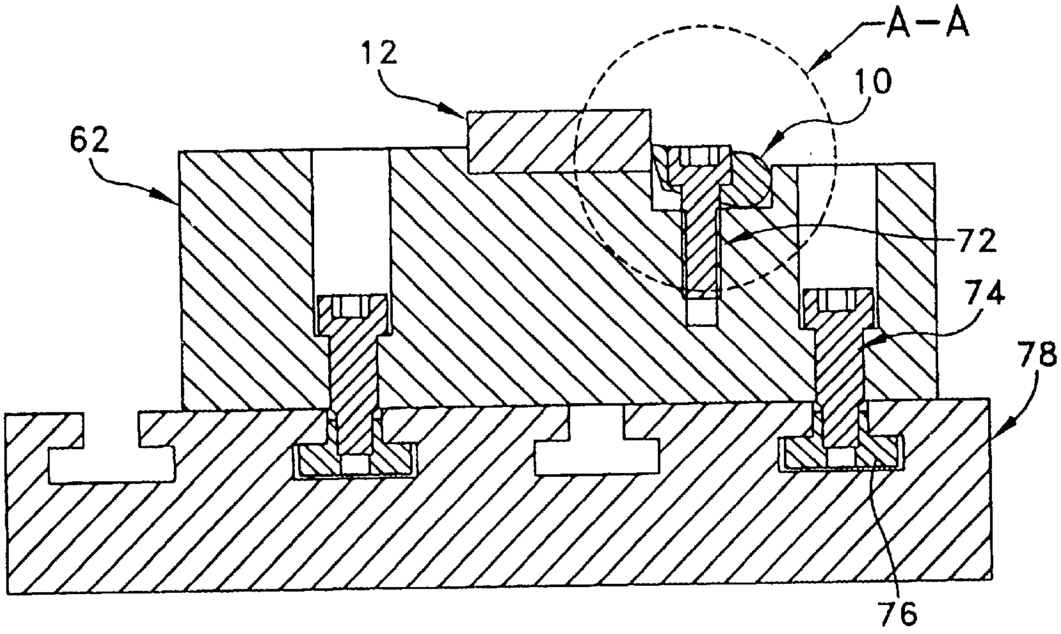
FIG. 24 is a side, cross-sectional view of a clamping system.

Looking now at FIGS. 22–24, a clamping system 60, incorporating a fixture base 62 with a clamp trough 64 and a workpiece-abutment edge 66, is shown. Clamp trough 64 contains a horizontal floor portion 68, a vertical wall portion 70, two tapped holes 72 (only one of which is shown in FIG. 24) in horizontal floor portion 68, and rocking clamps 10 for each tapped hole 72. The side of workpiece 12 opposite rocking clamps 10 is held by workpiece-abutment edge 66. As shown in FIGS. 23 and 24, screws 74 and T-nuts 76 attach fixture base 62 to a machine bed 78.

With respect to the embodiment shown in FIGS. 22–24, it should be appreciated that, for safety reasons, workpiece 12 is preferably clamped to fixture base 62 at a higher clamping force than fixture base 62 is clamped to machine bed 78. Thus, if fixture base 62 should move, there is no danger of workpiece 12 being released.

This one-piece design of fixture base 62 allows greater accuracy in clamping force, parallelism, and point of contact with workpiece 12 than a multi-piece embodiment.

It should also be appreciated that fixture base 62 may be securely held in one or more vices if desired.

In another preferred embodiment of the invention, rocking clamp 10 is automatically urged toward workpiece 12.

Figure 25:
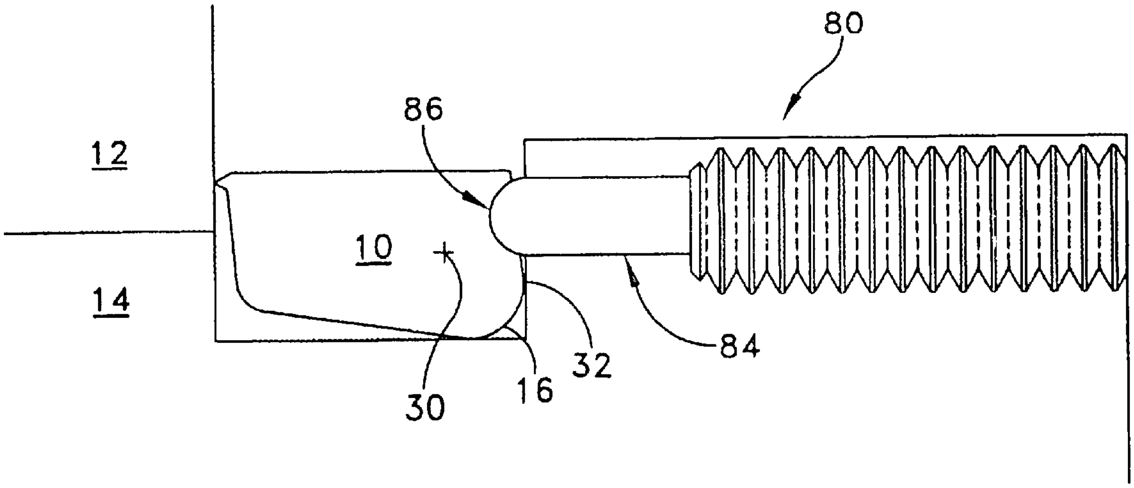
FIG. 25 is a side, cross-sectional view of an automatic clamping system.
Figure 26:
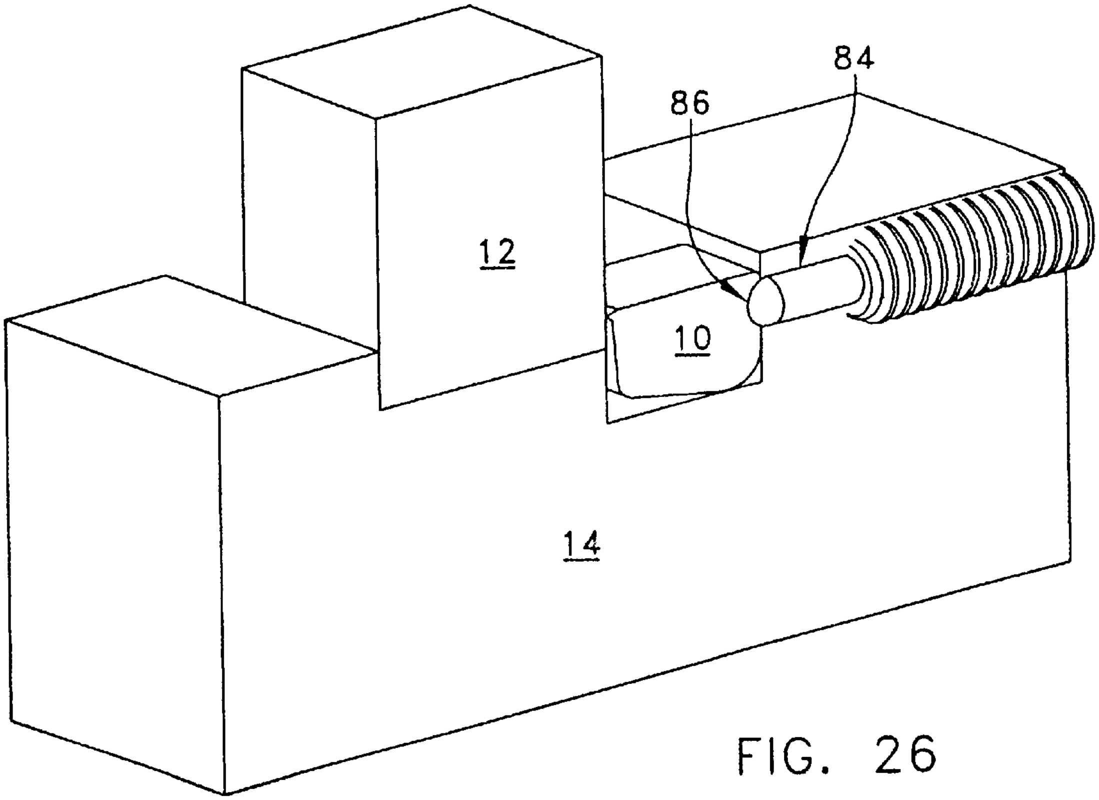
FIG. 26 is a perspective view of an automatic clamping system.

More particularly, and looking now at FIGS. 25 and 26, an automatic clamping system 80 is shown in which a hydraulic or thermal expansion mechanism 84 automatically drives rocking clamp 10. Expansion mechanism 84 extends from vertical wall portion 32 and drives rocking clamp 10 at a portion 86 of vertical arcuate edge 16 above center of rotation 30. Expansion mechanism 84 drives clamp 10 in place of jacking screw 28. If desired, expansion mechanism 84 may be adapted to drive clamp 10 vertically rather than horizontally (not shown).

Figure 27:
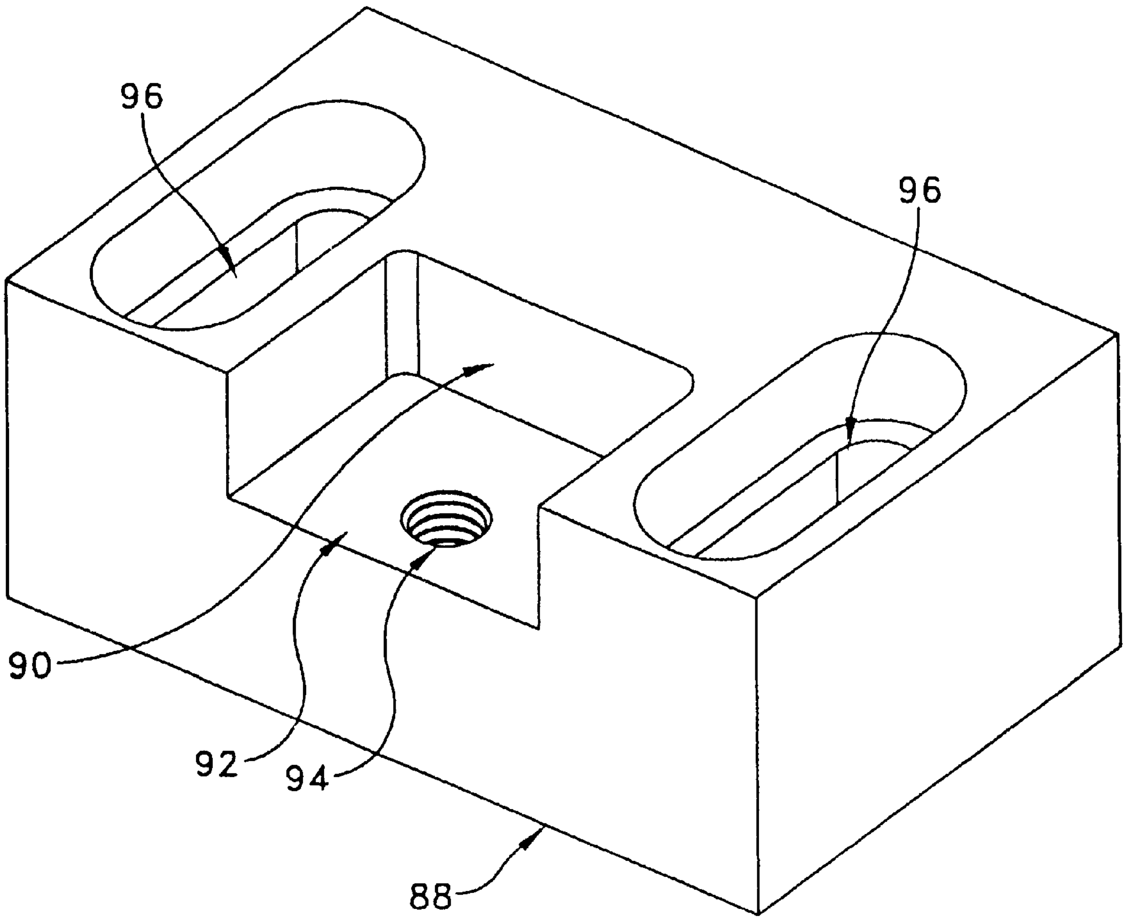
FIG. 27 is a perspective view of a modular clamp seat.
Figure 28:
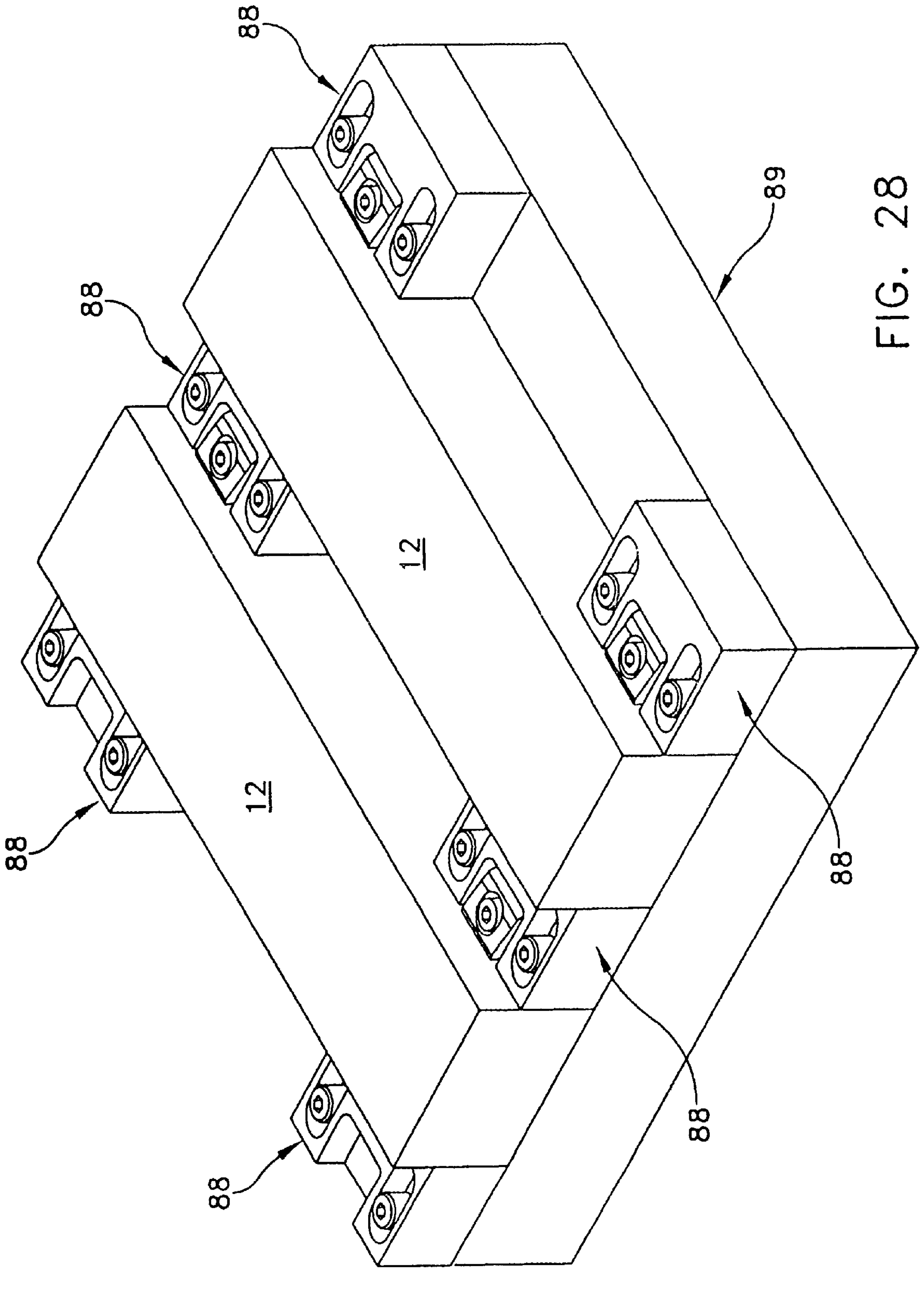
FIG. 28 is a perspective view of several modular clamp seats holding workpieces to a fixture plate.
Figure 29:
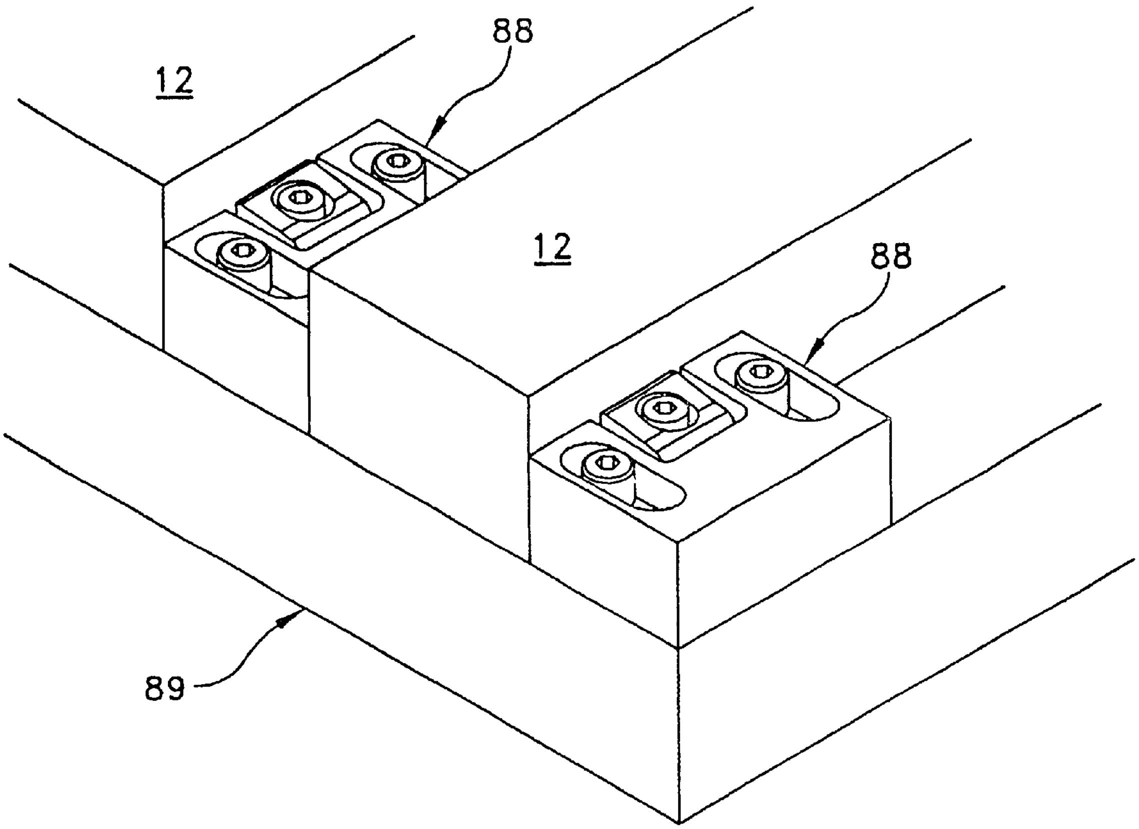
FIG. 29 is a perspective view of two modular clamp seats holding workpieces to a fixture plate.

Looking now at FIGS. 27–29, another preferred embodiment of the invention includes a modular clamp seat 88 for use on a fixture plate 89. Clamp seat 88 has a vertical wall portion 90 and a horizontal floor portion 92 for rotatably supporting vertical arcuate edge 16 (FIG. 1). Clamp seat 88 also has a tapped hole 94 through horizontal floor portion 92 for receiving jacking screw 28. Additional passages 96 are provided to secure modular clamp seat 88 to a fixture plate 89. It should also be appreciated that clamp seat 88 also serves as an additional abutment edge for workpiece 12.

Looking now at FIGS. 30 and 31, a gripping parallel 98 is shown for grinding applications. Gripping parallel 98 is formed of steel or another magnetic material. Gripping parallel 98 contains a notch 100 which forms a horizontal floor 102 and a vertical wall 104. Horizontal floor 102 has two tapped holes 106 which receive jacking screws 28. In an alternative embodiment, there may be one, or multiple, tapped holes below each clamp at 106. Rocking clamp 10 is attached with jacking screw 28 to each of tapped holes 106.

In FIG. 31, each gripping parallel 98 is positioned on a magnetic surface 108 to secure workpiece 12. In practice, it is preferred that the magnet or magnetic surface 108 is actuated before clamps 10 are tightened.

Figure 32:
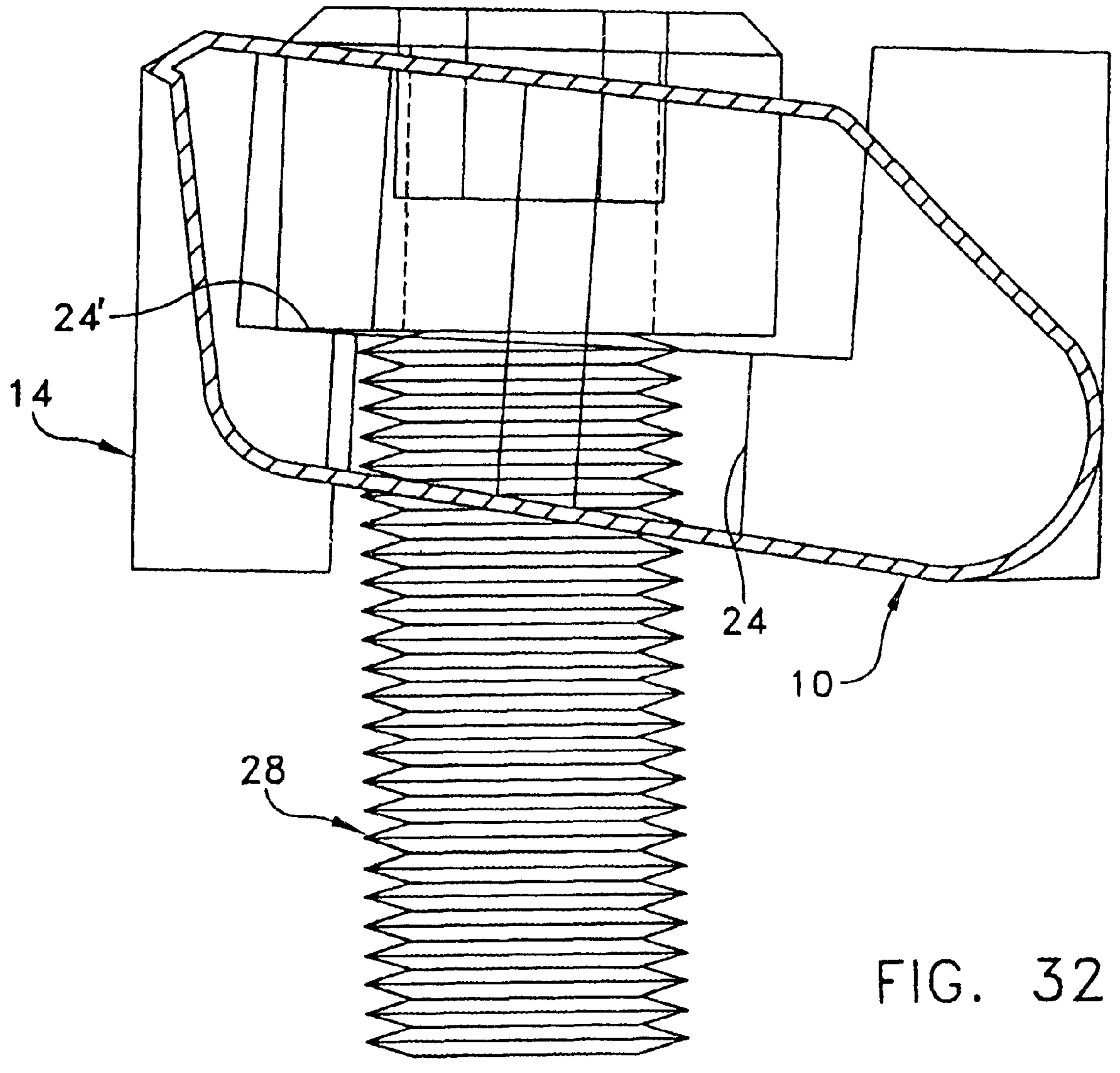
FIG. 32 is a side, cross-sectional view of a clamp showing off-center interfacing of jacking screw 28 with clamp 10.

FIG. 32 shows off-center interfacing of jacking screw 28 with clamp 10. In particular, in some circumstances, a substantial portion of the base of the screw may fail to engage the perimeter of the shoulder 24' in hole 24. Such off-center engagement can cause off-center loading, which in turn may bend or break jacking screw 28.

Figure 33:
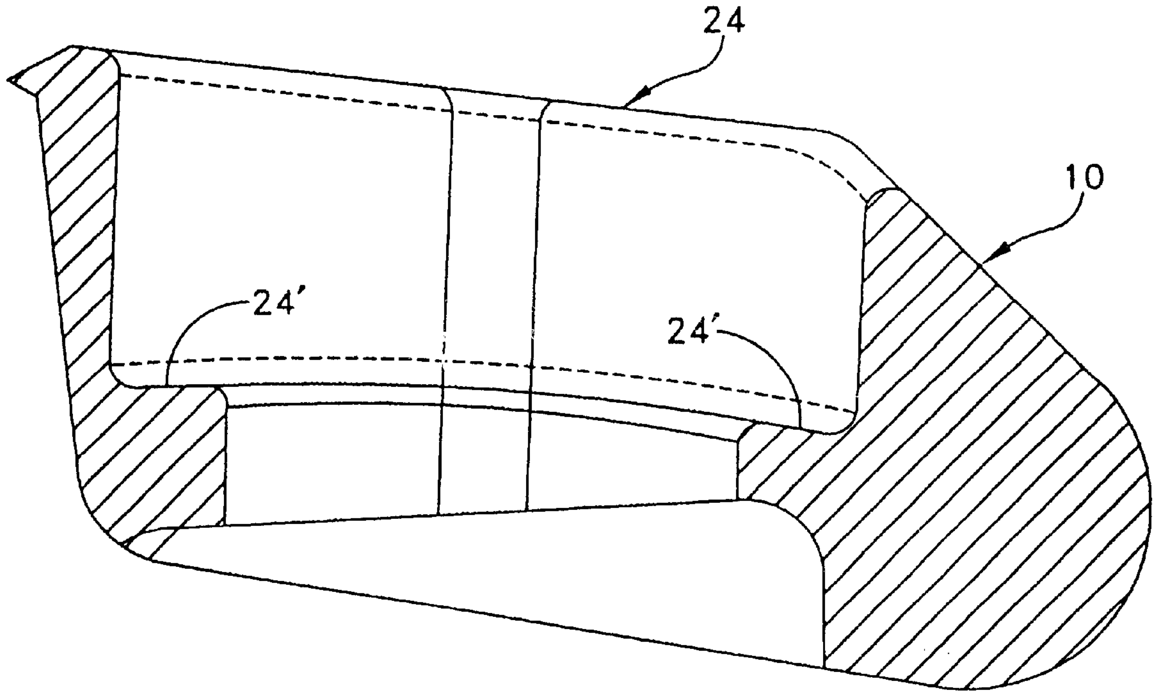
FIG. 33 is a perspective view of a clamp having a convex floor with a crowned edge within hole 24.

FIG. 33 shows a shoulder 24' which is convex along the axis 25 (FIG. 7). This geometry can be advantageous in some circumstances, since it increases the likelihood that the base of the screw will engage more of shoulder 24' and, hence, decrease the degree of any off-center loading.

What is claimed is:

1. A rocking lever clamp for securing a workpiece to a support, said rocking lever clamp comprising:

a vertical arcuate edge rotatably contacting the support at a vertical contact point and a horizontal contact point;

a workpiece-engaging edge located in opposing configuration to said vertical arcuate edge; and said rocking lever clamp containing a hole therethrough, said hole being located between said vertical arcuate edge and said workpiece-engaging edge, said hole being sized to allow non-threadable passage of a shank of a jacking screw and to restrict passage of a head of a jacking screw, and said hole being elongated in a direction of an axis from said vertical arcuate edge to said workpiece-engaging edge;

whereby inserting a jacking screw through said hole in said rocking lever clamp and tightening said jacking screw into the support causes said rocking lever clamp to drive the engaging edge into the workpiece.

2. The rocking lever clamp of claim 1 wherein the level of the support relative to the horizontal contact point of the rocking clamp is below the level of the support relative to the workpiece.

3. The rocking lever clamp of claim 1 wherein the level of the support relative to the horizontal contact point of the rocking clamp is equal to the level of the support relative to the workpiece.

4. The rocking lever clamp of claim 1 wherein the level of the support relative to the horizontal contact point of the rocking clamp is above the level of the support relative to the workpiece.

5. The rocking lever clamp of claim 1 wherein the vertical arcuate edge is a circular radius.

6. The rocking lever clamp of claim 5 wherein the support relative to the vertical arcuate edge is a circular radius conforming to the vertical arcuate edge.

7. The rocking lever clamp of claim 1 wherein the vertical arcuate edge is an elliptical radius.

8. The rocking lever clamp of claim 1 wherein the workpiece-engaging edge comprises at least one of the group comprising a knife edge, an angled edge, a serrated edge, a straight contact edge, and a rounded edge.

9. The rocking lever clamp of claim 1 wherein the workpiece-engaging edge is coated with at least one of a group comprising urethane, rubber, industrial diamond, polymer and a hardened material.

10. The rocking lever clamp of claim 1 further comprising a machinable jaw adjacent the workpiece-engaging edge.

11. The rocking lever clamp of claim 10 further comprising a removable pin configured between the support and the rocking lever clamp adjacent the workpiece-engaging edge.

12. The rocking lever clamp of claim 1 wherein said hole is counter-bored.

13. The rocking lever clamp of claim 1 futher comprising a convex shoulder along the elongated hole.

14. The rocking lever clamp of claim 13 further comprising a spherical washer at the radiused shoulder annularly configured about the jacking screw.

15. The rocking lever clamp of claim 1 further comprising an O-ring annularly configured about the jacking screw adjacent the rocking clamp on the side of the support.

16. The rocking lever clamp of claim 1 further comprising a spring annularly configured about the jacking screw between the rocking clamp and the support.

17. The rocking lever clamp of claim 1 further comprising a urethane skirt surrounding the rocking clamp.

18. The rocking lever clamp of claim 1 further comprising an elastomer encapsulation surrounding the rocking clamp.

19. A clamping system for securing a workpiece, said system comprising:

a fixture base with a clamp trough and a workpiece abutment edge;

said clamp through containing at least one tapped hole; and at least one rocking lever clamp corresponding to each of the at least one tapped hole, said at least one rocking lever clamp comprising:

a vertical arcuate edge rotatably contacting the support at a vertical contact point and a horizontal contact point;

a workpiece-engaging edge located in opposing configuration to said vertical arcuate edge; and said rocking lever clamp containing a hole therethrough, said hole being located between said vertical arcuate edge and said workpiece-engaging edge, said hole being sized to allow non-threadable passage of a shank of a jacking screw-and to restrict passage of a head of a jacking screw, and said hole being elongated in a direction of an axis from said vertical arcuate edge to said workpiece-engaging edge;

whereby inserting a jacking screw through said hole in said rocking lever clamp tightening said jacking screw into the support causes said rocking lever clamp to drive the engaging edge into the workpiece.

20. An automatic rocking lever clamp for securing a workpiece to a support, said automatic rocking lever clamp comprising:

a vertical arcuate edge rotatably contacting the support of a vertical contact point and a horizontal contact point;

a workpiece-engaging edge located in opposed configuration to the vertical arcuate edge;

a portion above a center of rotation of the vertical arcuate edge; and an expansion mechanism contained adjacent to and engaging the portion above the center of rotation of the vertical arcuate edge.

21. The system of claim 20 wherein the expansion mechanism is a hydraulic expansion mechanism.

22. The system of claim 20 wherein the expansion mechanism is a thermal mechanism.

23. The rocking clamp of claim 1 further comprising a modular rocking lever clamp seat for use with a fixture plate, the modular rocking lever clamp seat having a vertical wall portion and a horizontal floor portion to rotatably support the vertical arcuate edge of the rocking lever clamp, the horizontal floor portion containing a tapped hole to receive a jacking screw, and means for securing modular rocking lever clamp seat to a fixture plate.

* * * * *